Aug. 11, 1925.
J. A. LAMB
GLARESHIELD
Filed Oct. 15, 1923
1,549,094
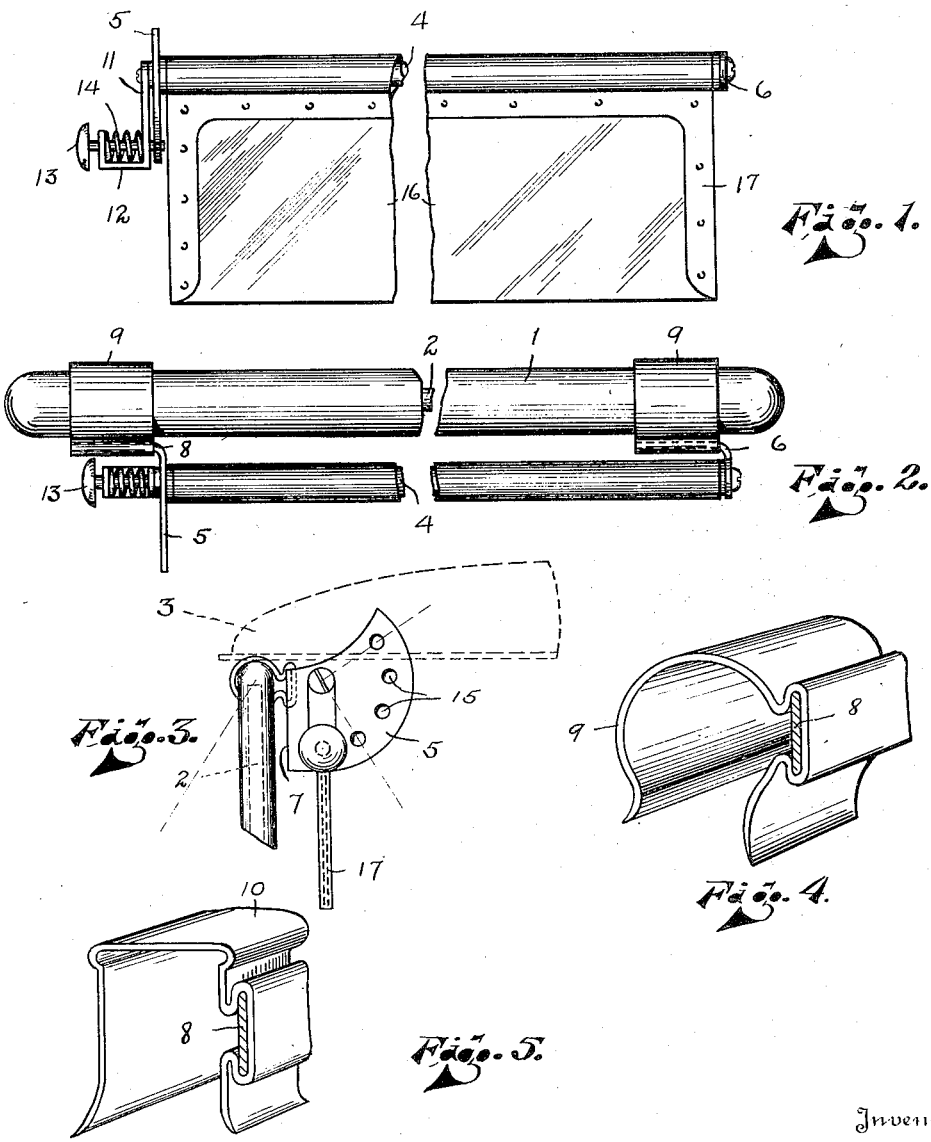
Inventor
John A. Lamb
By Geo. Stevens
Attorney Patented Aug. 11, 1925.

1,549,094

UNITED STATES PATENT OFFICE.

JOHN ALFRED LAMB, OF DULUTH, MINNESOTA.

GLARESHIELD.

Application filed October 15, 1923. Serial No. 668,461.

*To all whom it may concern:*

Be it known that I, JOHN A. LAMB, a citizen of the United States, residing at Duluth, in the county of St. Louis and State of Minnesota, have invented certain new and useful Improvements in Glareshields, of which the following is a specification, reference being had therein to the accompanying drawing.

This invention relates to shields and has particular reference to a glare shield for automobiles, the principal object of which is to provide a glare shield or vision protector for the driver and other occupants of a vehicle which may be most conveniently and quickly adjusted under varying circumstances.

Another object is to provide a shield of this character as closely as possible to the occupants of the car without being in the way whereby to protect the eyes from the widest horizontal angle possible so that the glare from an approaching car is effectively subdued until the cars are in approximately passing position.

Other objects and advantages of the novel construction will appear in the further description thereof.

Referring now to the accompanying drawing forming part of this application and in which like reference characters indicate like parts:

Figure 1 is a fragmental elevation of one of the improved glare shields as viewed from the interior of the car:

Figure 2 is a plan view of Figure 1 looking downwardly upon the upper edge of the glare shield:

Figure 3 is an end elevation of the corner of the wind shield with the improved glare shield attached:

Figure 4 is a perspective view of one form of windshield clip: and

Figure 5 is a similar view of a modified form of clip.

1 represents the upper bar of the wind shield frame and 2 is the glass therein, while 3 represents the forward end of the top of the automobile. 4 is a small rotatable shaft adapted to be installed preferably transverse the entire front of the car just inside of the upper frame of the wind shield thereof. This shaft is rotatably mounted in the two supporting brackets 5 and 6, the bracket 5 being made quadrantal in shape with the shaft 4 mounted adjacent the axial center of the circle forming the quadrant. This bracket is formed with a straight vertical edge 7 adjacent the upper terminus of which is a horizontal extension 8 formed parallel with the shaft 4, and the bracket 6 is of like construction in the latter respect though it is only sufficiently large to carry the opposite end of the shaft, it being of simple L-shaped form. The extensions of these brackets are for slidable engagement with suitable clips 9 or 10, as the case may be; the frames of some wind shields being round or oval in general form, while others are rectangular, or may vary somewhat, and this provision is made so that when a purchaser buys a shield he may obtain the form of clips best suited for the construction of his wind shield.

Rigidly fixed upon the operative end of the shaft 4 is the L-shaped crank arm 11, in the loop 12 of which is reciprocably mounted the stop pin 13 carrying within the loop the expansive spiral spring 14, the inner end of which is passed through the pin in order to maintain the latter normally in its innermost position. For co-operative engagement with this pin are a plurality of spaced holes 15 adjacent the arcuated edge of the quadrant so that the shaft 4 may be rotated selectively in respect to the holes.

The shield 16, which I prefer to have made of celluloid, colored glass, or other transparent material, may be wholly surrounded by a frame 17, or, particularly if of celluloid, only the uppermost edge and two ends may be sufficient to protect with a frame. In any event the upper portion of the frame is preferably made to surround and clamp tightly against the shaft 4 so that the wind shield becomes permanently fixed to said shaft and will be swung by the rotation of same. By this means it is evident that the manipulation of the crank arm 11 determines the angle desired for the glare shield, which may be readily adjusted irrespective of the position of the wind shield, and, while I have shown the improved glare shield or protector as applied to the wind shield, it is evident that the brackets 5 and 6 may be fastened directly upon the side supports or stanchions of the wind shield and a different form of clip from these specifically shown may be employed if desired; or the brackets 5 and 6 may be fastened directly to the wind shield.

I am aware that glare shields and visors of various construction have been patented, and many of them applied to automobiles, but in all cases so far as I am aware they have been attached to the cars or wind shields in such a manner as to project outwardly therefrom, except possibly certain hoods or inwardly projecting protection over the heads of the occupants of the front seat of the car, but in my improved shield the positioning of same inside of the wind shield permits not only of its ready adjustment to any desired position to accommodate the vision of the occupants of the car, but permits of its being stowed away, as it were, upwardly into close juxtaposition with the top of the car so as to not obstruct in any way whatsoever the view from the car, the shield thus becoming practically invisible from the exterior of the car.

Having thus described my invention, what I claim and desire to secure by Letters Patent, is:

A glare shield for automobile wind shields comprising in combination a plurality of frictionally engaged clips upon the upper bar of the wind shield, said clips having longitudinally disposed recesses therein, substantially L-shaped glare shield supporting brackets adjustably mounted longitudinally within the recesses in the clips, the protruding end of one of said brackets being enlarged and segmental in shape and having a plurality of holes near the circumferential extremity thereof, a rotatable shaft mounted within the projections of said brackets and parallel with the upper edge of the wind shield, a crank mounted upon the end of the shaft protruding through the enlarged bracket, spring controlled means carried by said crank for selective engagement with the holes in the bracket, and a colored transparent glare shield directly mounted upon said shaft.

In testimony whereof I hereunto affix my signature in the presence of two witnesses.

JOHN ALFRED LAMB.

Witnesses:
S. C. BRONSON,
S. GEO. STEVENS.